Patented Nov. 19, 1940

2,222,486

UNITED STATES PATENT OFFICE 2,222,486

COMPOSITION FOR COMBATING INSECT PESTS

William Moore, Cos Cob, Conn., assignor to American Cyanamid Company, New York, N. Y., a corporation of Maine No Drawing. Application June 9, 1937,
Serial No. 147,256

2 Claims. (Cl. 167—31)

The present invention relates to a method of combating soft bodied insects and allied pests by subjecting them to the action of a general insecticide effective as an ovicide, contact insecticide or stomach poison.

The principal object of the invention is the provision of an insecticide of the above type which will be effective for the purpose, but which will be without detrimental effect on the host plant.

It has been discovered that the dinitro alkyl phenols are particularly useful for this purpose and may be used in dilutions far greater than has been possible heretofore with insecticides of this type, and, consequently, with minimum damage to the host plant.

While experimental evidence indicates that the entire class of dinitro alkyl phenols are effective as insecticides, yet certain sub-groups or members of the series are more effective than others. It has been likewise determined that some insects and allied pests seem to have greater resistance to the poison than others, yet generally speaking, all members of the class are effective, although their effective toxicity in some cases appears to be dependent upon the use of higher concentrations and the manner in which actual contact is made with the responsive organ of the life to be killed.

Some of these substances are liquids and others solids. For instance, the dinitro para tertiary amyl phenol is a solid, while the corresponding ortho compound is a liquid. The salts of these compounds are solids. Consequently, the liquid materials are particularly adaptable for use as sprays or ingredients of sprays. They are normally not soluble to any great extent in water but are in organic liquids such as acetone, mineral oils and the like and consequently the active ingredient may be diluted with such an organic carrier and used as such or the solution may be emulsified with water to the desired dilution preferably with an emulsification agent.

Those compounds which are solids may likewise be used as dusts or ingredients of dusts. They may be effectively used with such inert solid diluents as kieselguhr or wood flour.

These phenols may also be used as salts, that is, where the hydrogen of the hydroxyl group has been replaced by a salt forming substance. For instance, the metallic salts are generally effective, those of the alkali forming metals, that is, the alkali and alkaline earth metals being particularly useful. Likewise, the ammonia and amine substitution products are very effective.

The salts of the above phenol compounds being solids, they may first be dissolved if they are to be used in the form of a spray, as in this form they are subject to great dilution. It is not essential that the salt be soluble, for in some cases, it has been found that even an insoluble salt such as a copper salt, is effective as such, without making a solution of it, using it as a dust as above described.

In some instances, it has been found desirable to make an emulsion of the active ingredient with a liquid diluent and to this end, suitable emulsifying or wetting agents may be used, such as casein and its salts, the organic sulfates and sulfonates and soaps. In many cases, these substances act as spreaders and assist not only in causing the distribution of the spray over the host plant but in other cases, actually assist in insuring adequate contact of the active ingredient with the insect.

Where it is desirable to use the phenolic compound itself, that is, not as a salt and it is also desired to make use of an emulsification or spreading agent, care must be exercised to see that such agent is not of a character which will react therewith to form a salt. For this reason, such emulsification or spreading agents should preferably be acid in character or used in an acid medium.

If, however, a phenolic complex is desired, it may be readily formed by mixing it with an emulsification or spreading agent which will react to form such complex. For instance, if a dinitro tertiary alkyl phenol is mixed or emulsified with ammonium or calcium caseinate, the corresponding ammonium or calcium phenolic complex will result.

Triethanol amine having spreading properties, it may be incorporated with a dinitro alkyl phenol to form a salt thereof in which event the dual function of the salt forming and spreading properties of the triethanol amine is of advantage. It has been found that the thus formed salt which is the reaction product of triethanol amine and a dinitro alkyl phenol acts as an emulsification agent for further quantities of the phenolic material. Consequently, the mixture may contain an excess quantity of the phenol over and above that necessary to completely react with the amine.

Actual experiments with such soft bodied insects as citrus red spider have shown that where the alkyl group is in the ortho position with respect to the hydroxyl, the most effective kills may be had. For instance, dinitro para tertiary amyl phenol is effective up to a dilution of 1 to 10,000, while with the amyl group in the ortho position, the dilution may be 1 to 160,000.

Both the dinitro ortho tertiary amyl phenols and its salts, particularly the ammonium and calcium salts have been found to be effective as ovicides in that adults did not develop from eggs of citrus red spider treated therewith, in dilutions of 1 to 10,000 as to salts and 1 to 20,000 as to the phenols themselves.

The dinitro para and ortho tertiary butyl phenols have been found to be particularly toxic to adult red spider, experiments indicating that 100% kill is obtainable on dilutions even as great as 1 to 40,000. A 91.8% kill was obtained in a dilution of 1 to 80,000, which demonstrates the unexpected effectiveness of these compounds.

Similarly, 100% kills of citrus red spider may be had at dilutions of from 1 to 20,000 to 1 to 40,000 with dinitro dialkyl phenols, amyl being preferred, and dinitro ortho normal alkyl phenol, the butyl form being particularly effective.

Obviously, more than one alkyl group may be introduced into the ring, as the dialkyl compounds and particularly the diamyl compound are very effective. The dialkyl compounds are particularly desirable in that they have been found to produce less burning or injury to the host plant when applied thereto for insecticidal purposes.

As an example of a method of preparing dinitro ortho tertiary amyl phenol, to 50 grams of concentrated sulphuric acid (specific gravity 1.835) is added 41 grams of ortho tertiary amyl phenol. Heat is generated spontaneously and the mixture should be stirred from 10 to 20 minutes. The product is then added to 300 grams of water and allowed to cool to approximately 30° C. 100 grams of concentrated nitric acid (specific gravity 1.42) is then added, which causes a rise in temperature to about 50° C. At this point, the color of the solution changes from clear pink to cloudy yellow, almost immediately.

After the initial temperature rise, the mixture may be heated and maintained at approximately 80 to 95° C. for from one to three hours with agitation. At the end of this period, the mixture is cooled to room temperature and the dinitro ortho tertiary amyl phenol separated in the form of a cloudy orange oil, heavier than the water layer. It may be purified by washing three times with water, the latter being removed from the compound by centrifuging. The resulting product, without further purification, checks on a nitrogen analysis for the compound $C_{11}H_{14}O_5N_2$. The boiling point of this substance ranges between 130 and 135° C. at 1 mm. pressure.

In a similar manner, dinitro para tertiary amyl phenol may be prepared from para tertiary amyl phenol. This compound is a yellow crystalline solid having a melting point of 66° C.

Similarly, other dinitro alkyl phenols may be prepared such as the butyl, hexyl, heptyl and higher homologs including their isomers.

As an example of a method of preparing a dinitro dialkyl phenol, the following is referred to as illustrative only:

When crude amyl alcohol is reacted with phenol, there are formed a large number of isomers of diamyl phenol as primary, secondary and tertiary compounds. These mixed diamyl phenols may then be nitrated as follows:

To 50 grams of concentrated sulphuric acid is added 40 grams of mixed diamyl phenols. The mixture is stirred for 20 to 30 minutes, and then diluted with 300 cc. of water. It is cooled to 25 to 35° C., and 100 grams of concentrated nitric acid is added. This causes a rise in temperature to approximately 50° C. The mixture is now heated on a water bath at 85° C. for 1½ to 2 hours. After it has been cooled, the dinitro product is separated, washed twice with water, and dried by heating on a boiling water bath for ½ hour in vacuo. The product obtained in this manner checks on a nitrogen analysis for the compounds $C_{16}H_{24}O_5N_2$.

Obviously any of the other dialkyl phenol compounds may be similarly prepared.

While the invention has been shown and described with specific reference to particular embodiments, it is to be understood that the invention is not to be restricted thereto, but is to be limited only by the scope of the claims.

I claim:

1. An insecticidal composition for soft bodied insects and allied pests including a dinitro dialkyl phenol or a salt thereof.

2. An insecticidal composition for soft bodied insects and allied pests including a dinitro diamyl phenol or a salt thereof.

WILLIAM MOORE.